(12) United States Patent
Mattice et al.

(10) Patent No.: US 7,566,215 B2
(45) Date of Patent: Jul. 28, 2009

(54) APPARATUS FOR PLACING MOLD CHARGES INTO A COMPRESSION MOLDING MACHINE

(75) Inventors: Daniel L. Mattice, Columbia City, IN (US); David C. Thompson, Grabill, IN (US)

(73) Assignee: Rexam Closure Systems Inc., Perrysburg, OH (US)

( * ) Notice: Subject to any disclaimer, the term of this patent is extended or adjusted under 35 U.S.C. 154(b) by 12 days.

(21) Appl. No.: 11/881,909

(22) Filed: Jul. 30, 2007

(65) Prior Publication Data

US 2009/0035407 A1 Feb. 5, 2009

(51) Int. Cl.
*B29C 43/08* (2006.01)

(52) U.S. Cl. .................. 425/348 R; 425/397; 425/403

(58) Field of Classification Search ............... 425/397, 425/400, 403, 394, 405.1, 348 R; 294/61; 414/19, 802
See application file for complete search history.

(56) References Cited

U.S. PATENT DOCUMENTS

| | | | |
|---|---|---|---|
| 1,356,174 A | 10/1920 | Soubier | |
| 2,175,407 A | 10/1939 | Peiler | |
| 2,224,759 A | 12/1940 | Canfield | |
| 2,425,592 A | 8/1947 | Bowe, Jr. | |
| 3,827,843 A | 8/1974 | Blouch | |
| 4,571,320 A * | 2/1986 | Walker | 425/397 |
| 5,370,519 A | 12/1994 | Shapcott | |
| 5,632,590 A * | 5/1997 | Pearson et al. | 414/404 |
| 5,637,329 A | 6/1997 | Abrams et al. | |
| 5,713,975 A | 2/1998 | Schonfeld et al. | |
| 5,753,280 A * | 5/1998 | Coxhead | 264/336 |
| 5,811,044 A | 9/1998 | Rote et al. | |
| 5,873,921 A | 2/1999 | Hirota et al. | |
| 6,893,247 B2 * | 5/2005 | Uytterhaeghe et al. | 425/397 |
| 7,247,014 B2 | 7/2007 | Mattice et al. | |
| 2006/0233904 A1 | 10/2006 | Mattice et al. | |

FOREIGN PATENT DOCUMENTS

WO WO 2007/045577 A2 4/2007

* cited by examiner

*Primary Examiner*—Yogendra Gupta
*Assistant Examiner*—Thu Khanh T Nguyen
(74) *Attorney, Agent, or Firm*—Reising Ethington P.C.

(57) ABSTRACT

An apparatus for placing mold charges into a mold of a compression molding machine includes a carrier, an arm pivotally mounted on the carrier and a mold charge pick-up cup on the arm at a position spaced from the carrier. The arm is pivotal on the carrier between a first position at which the arm is positioned to deposit a mold charge into a mold and a second position at which the mold charge pick-up cup is disposed to transport the mold charge. The carrier preferably is mounted for rotation around an axis. In some embodiments, a cam mechanism is coupled to the arm to pivot the arm as a function of rotation of the carrier. A spring may be coupled between the arm and the carrier for biasing the arm toward one of the first and second positions of the arm. In another embodiment, an actuator is carried by the carrier and coupled to the arm to pivot the arm with respect to the carrier. The arm preferably includes a passage for selective application of air and/or vacuum to the mold charge pick-up cup.

15 Claims, 8 Drawing Sheets

APPARATUS FOR PLACING MOLD CHARGES INTO A COMPRESSION MOLDING MACHINE

The present disclosure relates to a machine for compression molding plastic articles, such as closure shells or sealing liners within closure shells, and more particularly to an apparatus for placing mold charges into the molds of the compression molding machine.

BACKGROUND AND SUMMARY OF THE DISCLOSURE

Machines for compression molding closure shells, or compression molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the mold and a charge of molten plastic material is placed into the mold, and a closed position in which the mold sections are brought together to compression mold the shell or liner. In a liner machine, premade shells are placed in a nest when the mold sections are open, and a charge or pellet of liner material is placed within the mold before the mold is closed. U.S. patents that illustrate machines of this type for compression molding plastic closure shells include U.S. Pat. Nos. 5,670,110, 5,989,007, 6,074,583 and 6,478,568. U.S. patents that illustrate machines of this type for compression molding sealing liners within closure shells include U.S. Pat. No. 5,451,360. U.S. application Ser. No. 11/109,374 discloses a vertical wheel compression molding machine, which rotates around a horizontal axis, for compression molding closure shells or sealing liners within closure shells.

The present disclosure involves a number of aspects that can be implemented separately from or in combination with each other.

An apparatus for placing mold charges into a mold of a compression molding machine, in accordance with one aspect of the present disclosure, includes a carrier, an arm pivotally mounted on the carrier and a mold charge pick-up cup on the arm at a position spaced from the carrier. The arm is pivotal on the carrier between a first position at which the arm is positioned to deposit a mold charge into a mold and a second position at which the mold charge pick-up cup is disposed to transport the mold charge. The carrier preferably is mounted for rotation around an axis. In some embodiments, a cam mechanism is coupled to the arm to pivot the arm as a function of rotation of the carrier. A spring may be coupled between the arm and the carrier for biasing the arm toward one of the first and second positions of the arm. In another embodiment, an actuator is carried by the carrier and coupled to the arm to pivot the arm with respect to the carrier. The arm preferably includes a passage for selective application of air and/or vacuum to the mold charge pick-up cup.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

The disclosures of U.S. application Ser. Nos. 11/109,374 and 11/156,115 are incorporated herein by reference.

Figure 1:
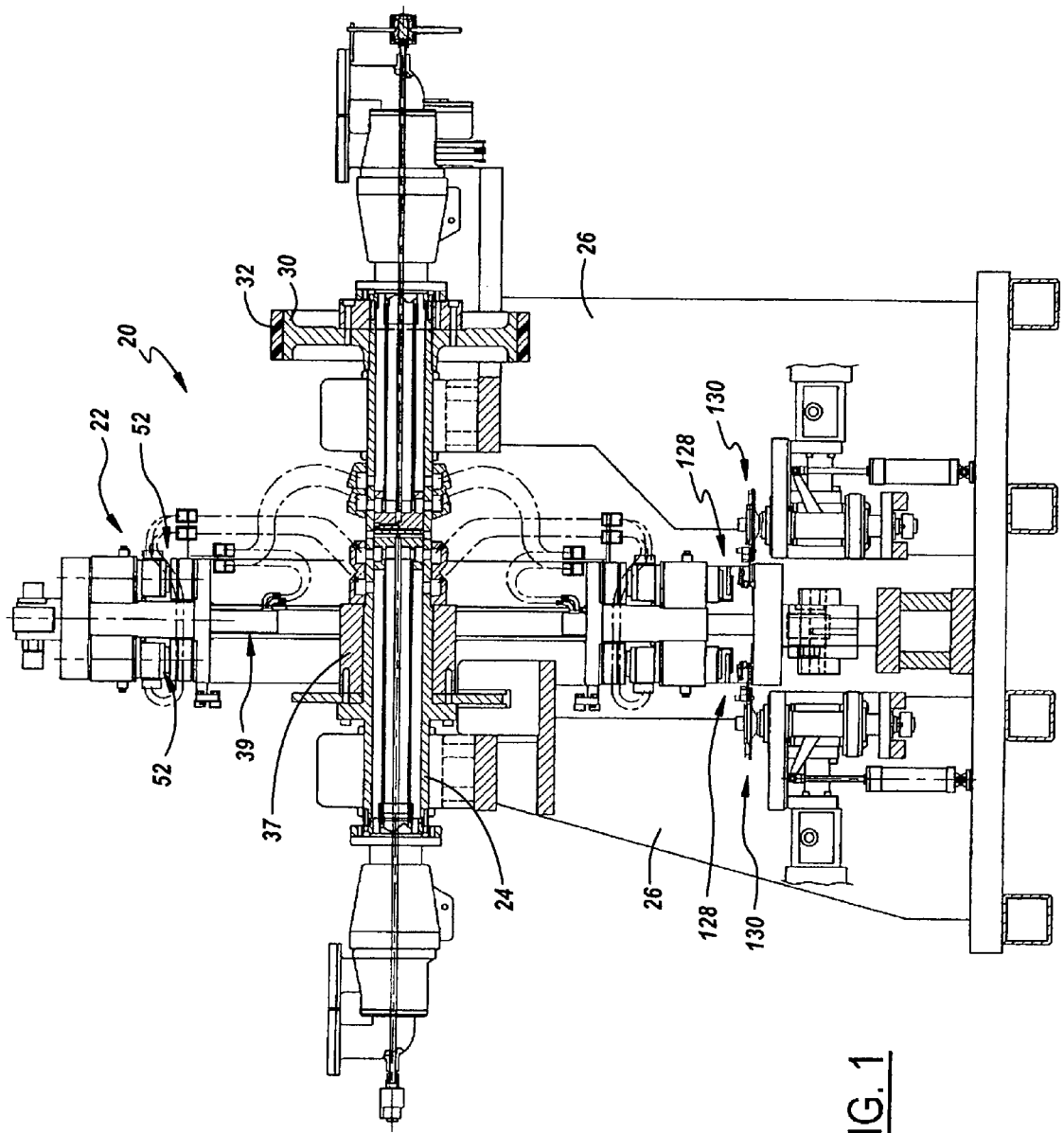
FIG. 1 is a front elevational view of a compression molding machine in accordance with one exemplary implementation of the present disclosure.

FIG. 1 illustrates an exemplary machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced spokes. A plurality of angularly spaced molds 52 are disposed around the periphery of wheel 22, preferably on both sides of the wheel. All of the molds 52 preferably are identical. An apparatus 128 is provided for removing molded parts from the compression molding machine, and an apparatus 130 is provided for placement of mold charges into the molding machine.

Figure 2:
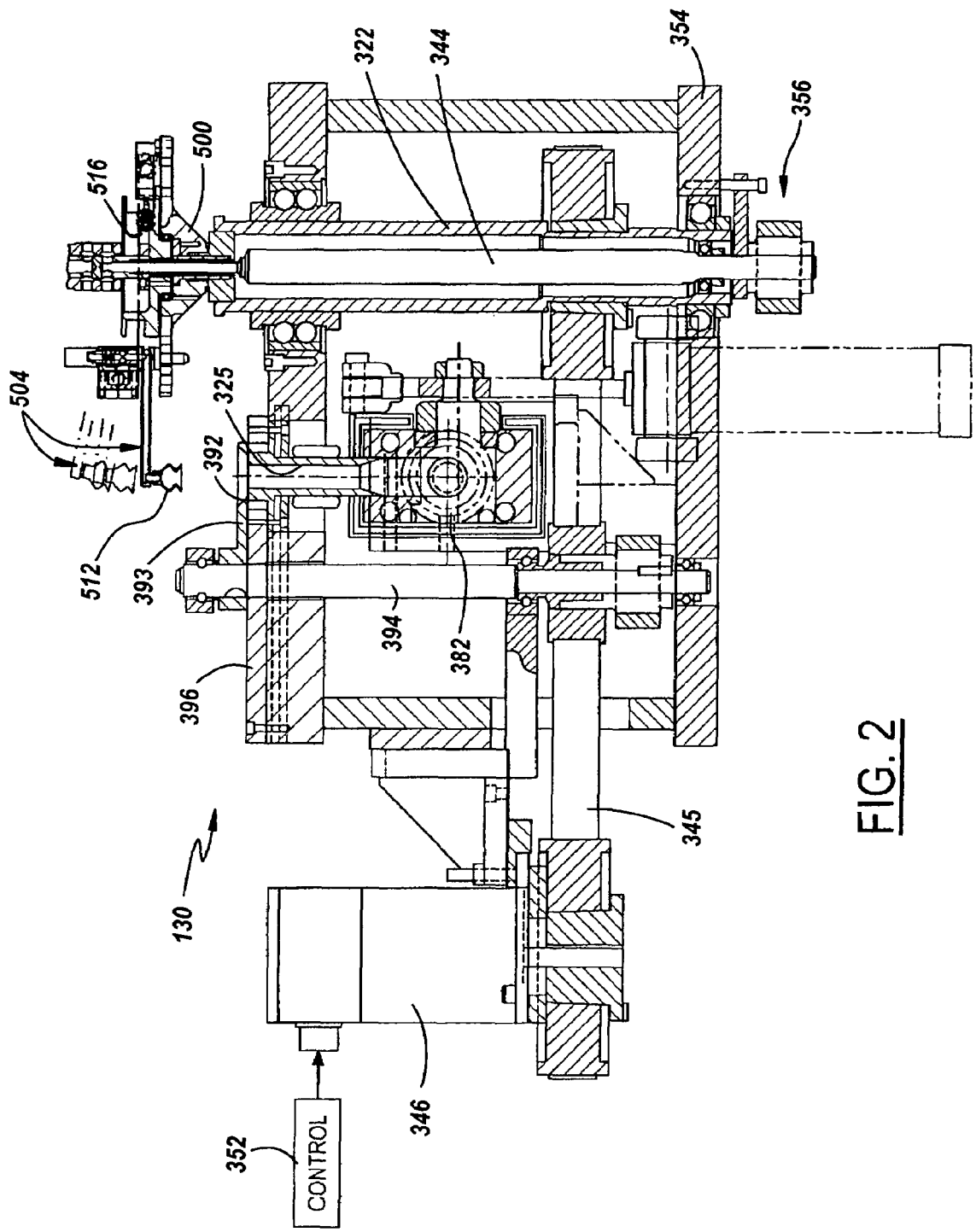
FIG. 2 is a sectional view on an enlarged scale of a mold charge placement apparatus in FIG. 1.

FIG. 2 illustrates an exemplary mold charge placement apparatus 130. An extruder nozzle 325 is parallel to but laterally offset from the axis of a sleeve 322 and a shaft 344. A pellet cutter knife 392 is coupled by an arm 393 to a blade shaft 394 for rotation along a plate 396 over the outlet of nozzle 325. The axis of shaft 394 is parallel to but laterally spaced from the axis of sleeve 322 and shaft 344. Sleeve 322 and shaft 394 are coupled by a belt 345 to a motor 346. Shaft 344 preferably is stationary in this embodiment. Shaft 344 preferably is coupled to frame 354 by a phase adjuster 356 for adjusting the "timing" of shaft 344 and cam 516 relative to sleeve 322 and carrier 502. Motor 346 is connected to a suitable control 352 for rotating sleeve 322, and rotating drive shaft 394 and blade 392, in synchronism with wheel 22 (FIG. 1). Motor 346 may comprise an independently controllable servo motor. As an alternative, sleeve 322 and shaft 394 could be coupled by suitable gears, pulleys or the like to wheel 22 (FIG. 1). Hot melt from an extruder may be fed to nozzle 325 by a diverter valve 382.

Figure 3:
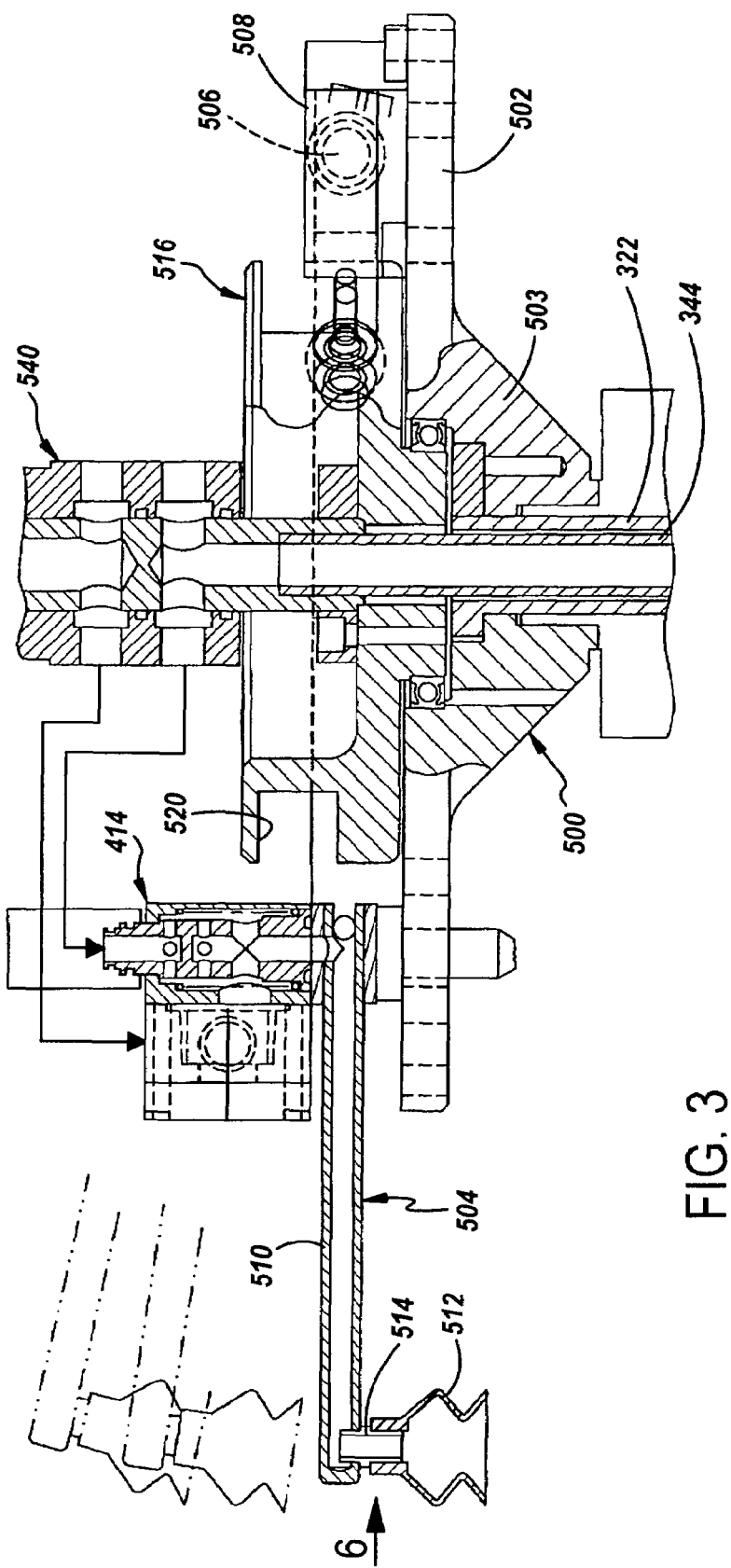
FIG. 3 is a sectional view on an enlarged scale of a portion of the mold charge placement apparatus illustrated in FIG. 2.
Figure 4:
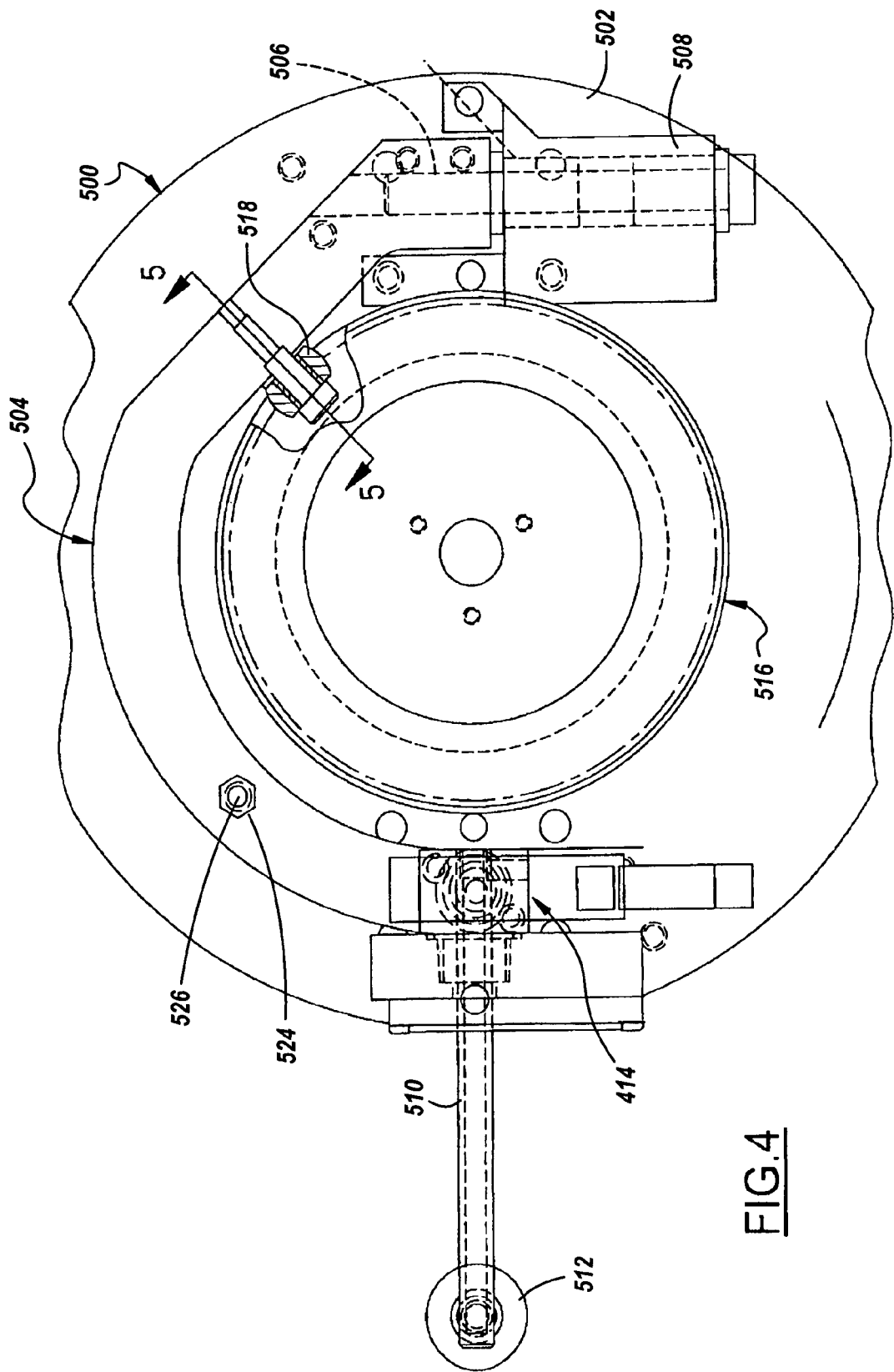
FIG. 4 is a top plan view of the mold charge placement apparatus illustrated in FIG. 3.

A carrier 500 (FIGS. 3-6) is coupled to sleeve 322 for corotation with the sleeve. Carrier 500 preferably includes a circular plate 502 carried by a hub 503. An arm 504, which is generally C-shaped in this embodiment as viewed from above in FIG. 4, is coupled to a pin 506 that is pivotally received within a block 508 on carrier 500, preferably adjacent to the periphery of plate 502. The opposing end of arm 504, which generally is diametrically opposite from block 508 in FIG. 4, carries a hollow tube 510 that extends outwardly from the end of arm 504—i.e., away from the axis of rotation of carrier 500. A mold charge pick-up cup 512 is mounted on a fitting 514 that extends from the end of tube 500 in a direction generally perpendicular to the axis of tube 510. The hollow interior of tube 510 communicates through fitting 514 with the hollow interior of mold charge pick-up cup 512. Mold charge pick-up cup 512 preferably is of annular bellows-shaped construction, although other pick-up cup geometries can be employed. Mold charge pick-up cup 512 preferably is of flexible resilient elastomeric construction such as silicone. An air/vacuum control valve 414 is mounted on arm 504 and communicates with the hollow interior of tube 510.

Figure 5:
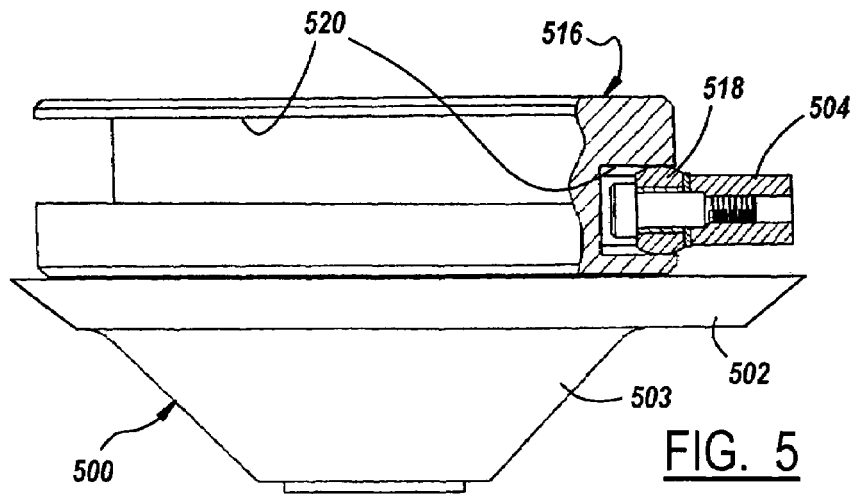
FIG. 5 is a fragmentary sectional view taken substantially along the line 5-5 in FIG. 4.
Figure 6:
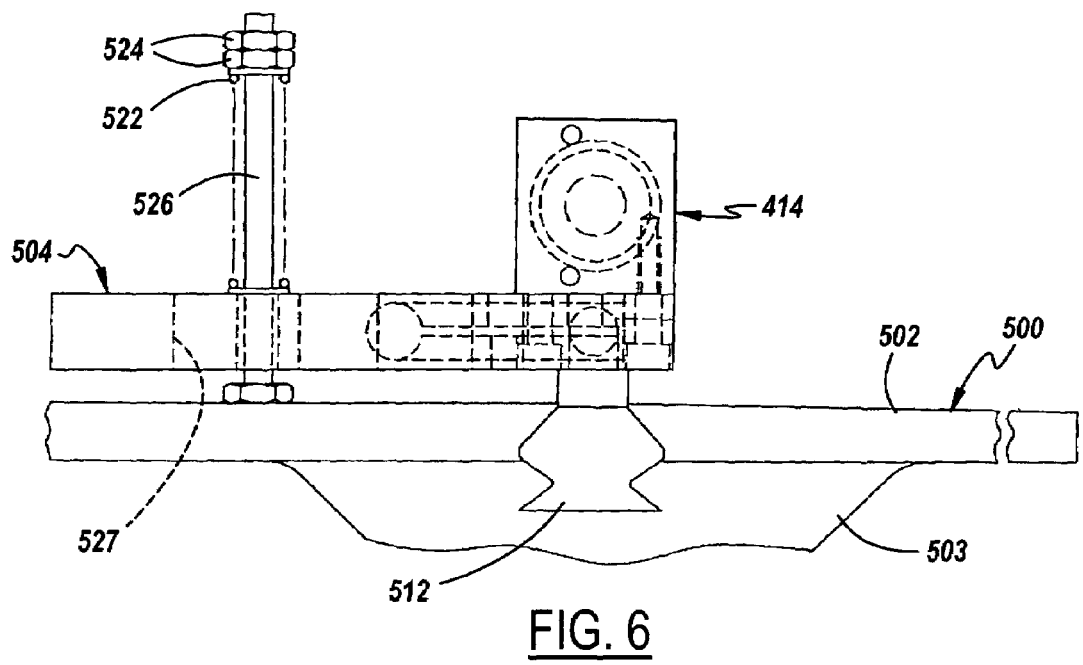
FIG. 6 is an end elevational view taken substantially from the direction 6 in FIG. 3.

A cam 516 is mounted on shaft 344 in angularly adjustable fixed position around the axis of rotation of sleeve 322 and carrier 500. A cam follower roller 518 is mounted on arm 504 and is received in a radially outwardly opening slot 520 around the periphery of cam 516. The elevation of cam slot 520 varies around cam 510, as best seen in FIG. 5. Thus, as carrier 500 and arm 504 rotate around cam 516, tube 510 and mold charge pick-up cup 512 are pivoted between a first position illustrated in solid lines in FIGS. 3 and 6, at which a mold charge carried by the pick-up cup is deposited into a mold 52 (FIG. 1), and a second or raised position illustrated in phantom in FIG. 3 for transporting the mold charge between a pick-up position overlying extruder nozzle 325 (FIG. 2) and the compression mold. A coil spring 522 (FIG. 6) is captured in compression between nuts 524 adjustably positioned on a threaded shaft 526 and the opposing face of arm 504 for biasing the arm toward the fully lowered position illustrated in FIG. 3. Shaft 526 passes through an opening 527 (FIG. 6) in arm 504. A rotary valve 540 feeds compressed air to air/vacuum control valve 414.

Figure 7:
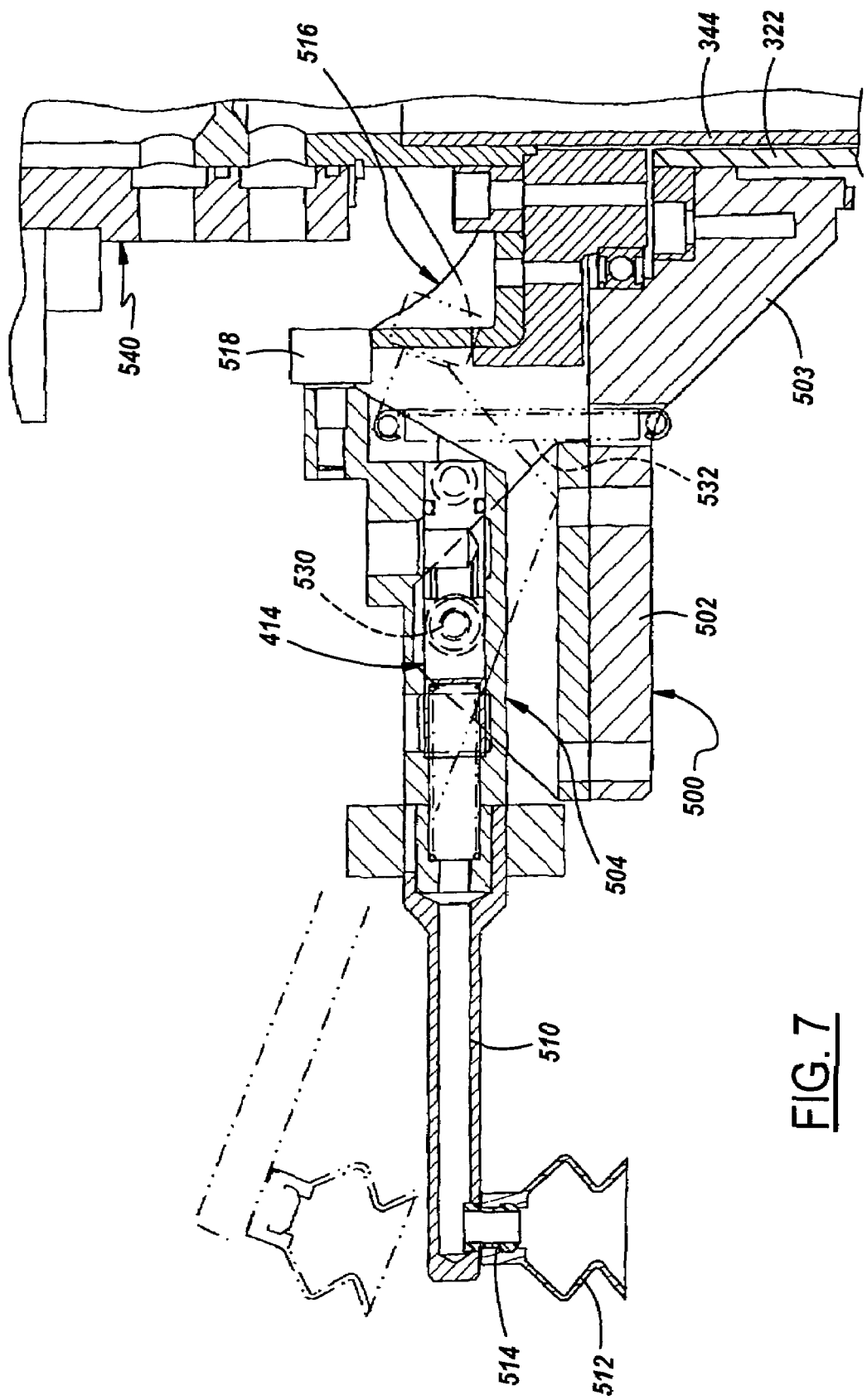
FIG. 7 is a fragmentary sectional view that illustrates a modification to the embodiment of FIG. 3.

FIG. 7 illustrates a modification to the apparatus of FIGS. 3-6, in which reference numerals that are identical to those employed in connection with FIGS. 3-6 (and FIG. 8) illustrate identical or corresponding elements. In the apparatus of FIG. 7, the arm 504 is pivotal around the axis of a pin 530 on carrier 500. A cam roller 518 extends radially inwardly from arm 504, and is held in engagement with cam 516 by a coil spring 532 that extends in tension between arm 504 and carrier 500. In this embodiment, spring 532 biases arm 504 toward the fully raised position of the arm. Air/vacuum control valve 414 again is carried by arm 504 to control application of air and/or vacuum through the hollow interior of tube 510 and fitting 514 to mold charge pick-up cup 512. The embodiment of FIG. 7 has the advantage over the embodiment of FIGS. 3-6 that pick-up arms 504 can be placed on diametrically opposite sides of carrier 500 or at other angularly spaced intervals around the carrier. In this embodiment, air/vacuum control valve 414 is disposed within arm 504.

Figure 8:
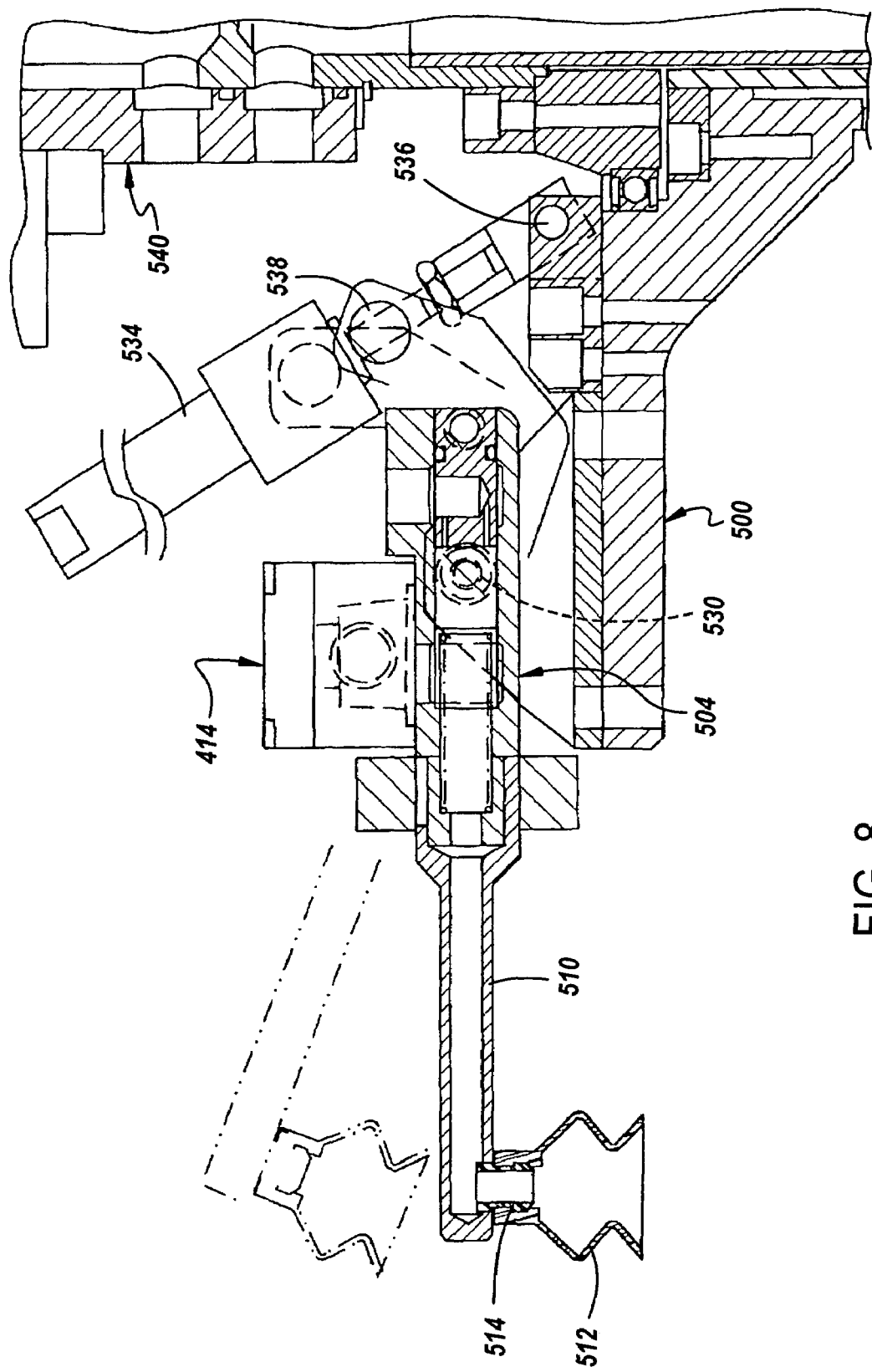
FIG. 8 is a fragmentary sectional view that illustrates another modification to the embodiment of FIG. 3.

FIG. 8 illustrates a modification to the embodiment of FIG. 7, in which arm 504 is pivotal around pin 530 by means of an actuator 534 mounted on carrier 500. Actuator 534 is pivotally coupled to carrier 500 at pin 536, and is pivotally coupled to the radially inner end of arm 504 at pin 538. Actuator 534 preferably is a fluid actuator. The fluid actuator may be coupled through a suitable control valve to a source of air under pressure in parallel with control valve 414. Actuator 534 alternatively may be an electrical actuator.

Figure 9:
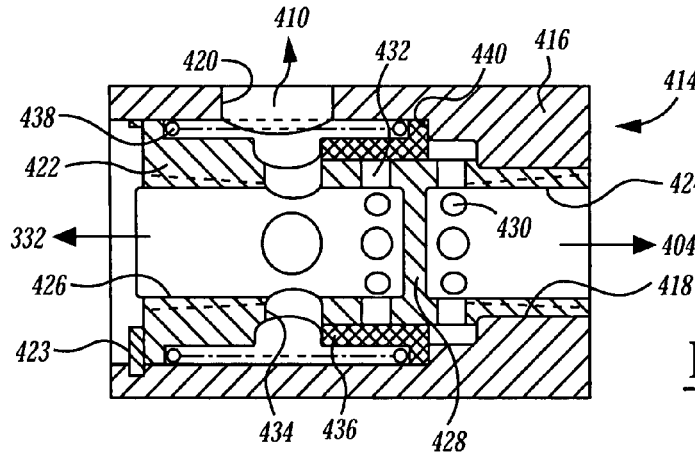
FIGS. 9-12 are sectional views on an enlarged scale of the vacuum/air control valve in the embodiment of FIG. 3.
Figure 10:
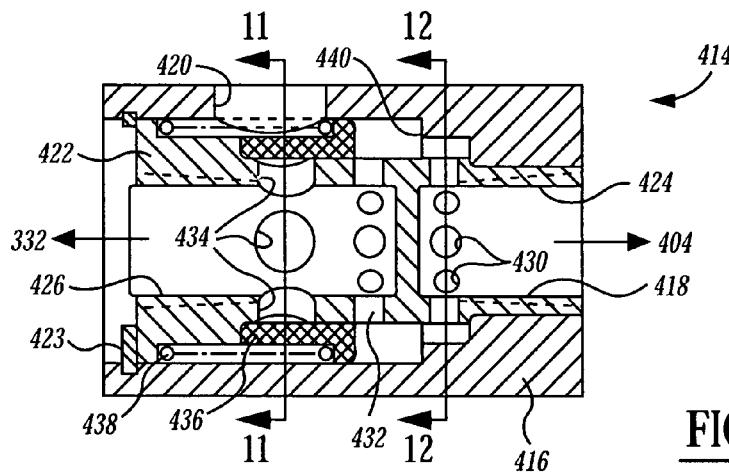
Figure 11:
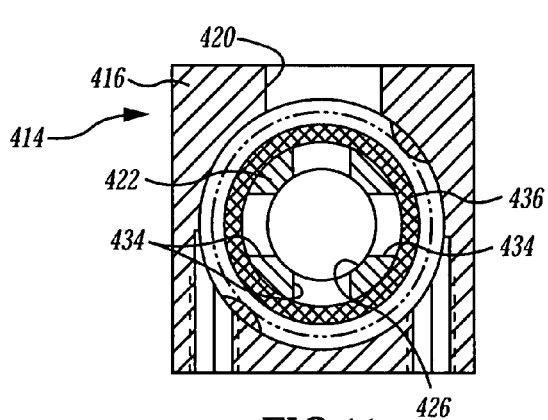
Figure 12:
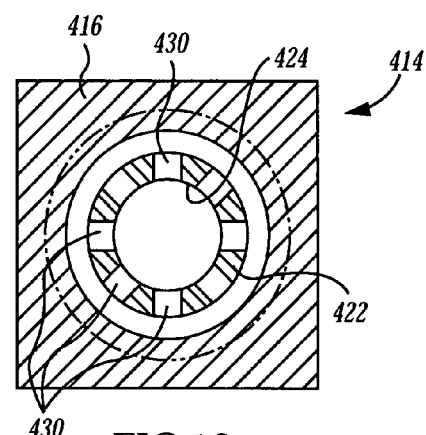

An exemplary embodiment of air/vacuum control valve 414 (FIGS. 3, 7 and 8) is illustrated in FIGS. 9-12. A valve body 416 has a longitudinal passage 418 that communicates with a lateral opening 420. A valve insert 422 is non-movably mounted within passage 418 of valve body 416, such as by a retaining ring 423. Insert 422 has aligned axial passages 424 and 426 that are separated from each other by a lateral wall 428. At least one opening 430, preferably a plurality of angularly spaced openings 430 extend through the sidewall of insert 422 from opening 424 adjacent to wall 428. At least one second opening 432, preferably a plurality of angularly spaced second openings extend through the sidewall of insert 422 from opening 426 adjacent to wall 428. At least one third opening 434, preferably a plurality of angularly spaced openings 434 extend through the sidewall of insert 422 from opening 426 at a position spaced from wall 428. A shuttle 436 is slidably mounted on the exterior of insert 422 and biased by a spring 438 against a shoulder 440 within body 416. Shuttle 436 normally covers openings 432 and uncovers openings 434 in insert 422, as shown in FIG. 9.

Opening 424 of insert 422 is connected to a source of compressed air or other gas. Opening 420 in valve body 416 is connected to a source of vacuum. Opening 426 of insert 422 is connected through tube 510 to mold charge pick-up cup 512 (FIG. 3). In the absence of air under pressure from valve 404, shuttle 436 is in the spring-biased position of FIG. 9, and vacuum is applied to cup 512 through opening 420 in valve body 416, and openings 434 and 426 of insert 422. When air under pressure is applied to insert opening 424, the air under pressure is applied to shuttle 436 through openings 430, moving shuttle 436 to the position of FIG. 10 against the force of spring 438. Application of vacuum to cup 512 is then blocked by blockage of openings 434 in insert 422. In the meantime, air under pressure now is fed through openings 430 and 432 to insert opening 426, and thence to cup 512. Thus, in the embodiments of FIGS. 3-8, vacuum and air under pressure are applied alternately to the mold charge pick-up cup.

The disclosure thus has been presented in conjunction with several exemplary embodiments, and a number of additional modifications and variations have been discussed. Other modifications and variations readily will suggest themselves to persons of ordinary skill in the art in view of the foregoing discussion. For example, although the disclosure has been presented in conjunction with a horizontal axis vertical wheel compression molding machine, it will be apparent that the mold charge placement apparatus of the present disclosure can be used equally as well in conjunction with vertical axis carousel-type machines for placing mold charges into the molds of the machine. The disclosure is intended to embrace all such modifications and variations as fall within the spirit and broad scope of the appended claims.

The invention claimed is:

1. Apparatus for placing mold charges into a mold of a compression molding machine, which includes:
   a carrier, mounted for rotation around a carrier axis,
   an arm pivotally mounted on said carrier,
   a cam mechanism coupled to said arm to pivot said arm, wherein said arm pivots as a function of rotation of said carrier, and
   a mold charge pick-up cup on said arm at a position spaced from said carrier,
   said arm including a passage for selective application of air and/or vacuum to said mold charge pick-up cup,
   said arm being pivotal on said carrier between at least a first position at which said arm is positioned on said carrier to deposit a mold charge into a mold and a second position at which said mold charge pick-up cup is disposed to transport the mold charge to the mold.

2. The apparatus set forth in claim 1 including a spring between said arm and said carrier for biasing said arm toward one of said first and second positions.

3. The apparatus set forth in claim 1 including an actuator on said carrier and coupled to said arm to pivot said arm with respect to said carrier.

4. The apparatus set forth in claim 3 wherein said actuator is a fluid actuator.

5. Apparatus for placing mold charges into molds of a compression molding machine, which includes:
- a carrier mounted for rotation around a carrier axis,
- an arm pivotally mounted on said carrier for motion around an arm axis perpendicular to said carrier axis,
- a mold charge pick-up cup on said arm at a position spaced from said carrier,
- a passage in said arm for selective application of air and/or vacuum to said mold charge pick-up cup on said arm, and
- means for pivoting said arm with respect to said carrier wherein said arm pivots as a function of rotation of said carrier between a first position adjacent to said carrier to deposit a mold charge from said cup into a mold and a second position spaced from said carrier for transporting the mold charge to the mold.

6. The apparatus set forth in claim 5 including a control valve on said arm, said control valve having a first input for connection to a vacuum source, a second input for connection to a source of air under pressure, an output for connection to said passage, a shuttle and a spring biasing said shuttle to feed vacuum to said passage, said shuttle being responsive to air under pressure at said second input to block application of vacuum to said passage and to feed air under pressure to said passage.

7. The apparatus set forth in claim 5 wherein said means includes a cam disposed adjacent to said carrier and a cam follower on said arm.

8. The apparatus set forth in claim 7 wherein said cam is disposed in fixed position surrounding said carrier axis.

9. The apparatus set forth in claim 8 including a coil spring extending between said carrier and said arm to bias said arm toward one of said first and second positions.

10. The apparatus set forth in claim 5 wherein said means includes an actuator mounted on said carrier and coupled to said arm.

11. The apparatus set forth in claim 10 wherein said actuator is a fluid actuator.

12. Apparatus for placing mold charges into a mold of a compression molding machine, which includes:
- a carrier mounted for rotation around an axis,
- an arm movably mounted on said carrier,
- a mold charge pick-up cup on said arm at a position spaced from said carrier, and
- a cam mechanism coupled to said arm to move said arm, wherein said arm moves as a function of rotation of said carrier, and said arm being movable on said carrier between at least a first position at which said arm is positioned on said carrier to deposit a mold charge into a mold and a second position at which said mold charge pick-up cup is disposed to transport the mold charge to the mold,
- said arm including a passage for selective application of air and/or vacuum to said mold charge pick-up cup.

13. The apparatus set forth in claim 12, wherein said arm moves about an arm axis.

14. The apparatus set forth in claim 13, wherein said arm pivots about the arm axis.

15. The apparatus set forth in claim 12, further comprising:
- at least one other arm movably mounted on said carrier,
- at least one other mold charge pick-up cup on said at least one other arm at a position spaced from said carrier, and
- wherein said cam mechanism is coupled to said at least one other arm to move said at least one other arm, wherein said at least one other arm moves as a function of rotation of said carrier, and said at least one other arm being movable on said carrier between at least a first position at which said at least one other arm is positioned on said carrier to deposit a mold charge into a mold and a second position at which said at least one other mold charge pick-up cup is disposed to transport the mold charge to the mold,
- said at least one other arm including a passage for selective application of air and/or vacuum to said at least one other mold charge pick-up cup.

* * * * *